(12) United States Patent
Kanaris

(10) Patent No.: US 6,837,364 B2
(45) Date of Patent: Jan. 4, 2005

(54) CLUTCH AND BRAKE FOR A CONVEYOR DRIVE ROLL

(75) Inventor: Alexander D Kanaris, Richmond Hill (CA)

(73) Assignee: Van Der Graaf Inc., Brampton (CA)

(*) Notice: Subject to any disclaimer, the term of this patent is extended or adjusted under 35 U.S.C. 154(b) by 0 days.

(21) Appl. No.: 10/372,338

(22) Filed: Feb. 25, 2003

(65) Prior Publication Data
US 2004/0163934 A1 Aug. 26, 2004

(51) Int. Cl.⁷ .............................................. B65G 13/02
(52) U.S. Cl. ...................................... 198/782; 198/788
(58) Field of Search .............................. 198/780, 782, 198/788, 789

(56) References Cited

U.S. PATENT DOCUMENTS

| | | | | |
|---|---|---|---|---|
| 5,020,657 A | * | 6/1991 | Huber | 198/782 |
| 5,042,645 A | * | 8/1991 | Pritchard | 198/782 |
| 5,131,527 A | * | 7/1992 | Huber | 198/788 |
| 5,156,263 A | | 10/1992 | Ledet | |
| 5,215,184 A | * | 6/1993 | Huber | 198/782 |
| 5,253,748 A | | 10/1993 | Ledet | |
| 5,934,447 A | | 8/1999 | Kanaris | |
| 6,450,325 B1 | * | 9/2002 | Devnani | 198/788 |

* cited by examiner

*Primary Examiner*—James R. Bidwell
(74) *Attorney, Agent, or Firm*—Venable LLP; Thomas G. Wiseman

(57) ABSTRACT

An intermittent internal drive system for a drum conveyor, where the conveyor is started, stopped and restarted and having a drive drum with a hollow interior, a drive motor mounted within and enclosed by the drum for rotating the drum, a clutch located within and enclosed by the drum and connected to the motor and for transmitting rotation from the motor to the drum, and, a brake within and enclosed by the drum and connected to the drum for restraining rotation of the drum.

14 Claims, 5 Drawing Sheets

CLUTCH AND BRAKE FOR A CONVEYOR DRIVE ROLL

FIELD OF THE INVENTION

The invention relates to conveyor drive rollers driven by electric motors and in particular to such a conveyor drive roller which is required to stop and restart frequently. Such conveyors are particularly though not exclusively of utility in luggage conveyors used in the air and travel industry where it is necessary to repeatedly stop and restart the conveyor in order to check the bar code, and possibly to perform other forms of sensing where it is necessary to have each item stationary for a moment, such as each individual piece of luggage on the conveyor.

BACKGROUND OF THE INVENTION

Conveyors having conveyor drive rollers which are driven by internal motor/gear combinations are of particular utility in many applications. In these conveyors the motor/gear mechanism is entirely contained within the conveyor drive roll itself. The internal motor/gear system makes for a compact space saving installation. It also greatly reduces maintenance and down time. It virtually eliminates hazards for accidents, and eliminates contamination of the motor/gear drive from dust and debris in the environment in which it is running.

All of these factors make the use of such internal drive conveyors particularly useful and desirable.

Many conveyors are required for continuous, steady speed operation. They are stopped only at the end of a day, or, rarely, for an emergency.

However there are also many applications for such conveyors which require repetitive start/stop/restart operation of the conveyor. This is becoming particularly necessary in the case of luggage conveyors used in the travel industry. In these cases there is a requirement that each piece of luggage has a label printed with the well known Universal Bar Code, (UBC) marking.

This is partly for security reasons, and more importantly for ensuring that the luggage is routed to the correct destination.

It also is of great assistance in identifying a piece of lost luggage.

In order to read the bar code it is necessary that each piece of luggage on the conveyor shall be stationary, for a brief time period.

This in turn means that the conveyor must stop briefly for each individual item, in this case a piece of luggage, to be checked and then restart again, and then stop, and so on, repeatedly.

This is only one example of many applications for conveyors where start/stop/restart operation is required. Such repetitive star/stop/restart operation causes stresses on the drive system. However and more importantly, when the electric drive motor is stopped and restarted, it starts from zero revolutions, and must get up to drive speed in a short time. This causes power surges in the power drawn by the drive motor, which is a well known problem. The power consumption on start up is at least three times, or more, the power consumption at steady state running speed.

The electrical supply to the motor must therefore be capable of carrying excessive currents, simply in order to run the conveyor in such intermittent operations.

Such power surges or "spikes" cause greatly increased charges for power. This is because the power supply to the operator of the conveyor must be adequate to handle the peak power consumption, at these surges, even though when running in steady state the power consumption is only a fraction of the power consumption on start up. The utility company will charge based on power consumption at maximum, rather than average power consumption. Anything that can be done to reduce these power surges or peaks will produce a significant saving in power costs.

Clearly it is desirable to as far as possible reduce these power surges, and to smooth out the power drawn by the motor. This alone will substantially reduce to cost of power for operating the conveyor, and will enable engineers to specify lighter duty wiring and controls for the power supply.

This can be done by the use of a clutch system coupling and uncoupling the motor from the drive roll. The motor can be maintained at regular operational speed, and the conveyor started and stopped by means of the clutch. However building such a motor/clutch combination, operating at a high repetition rate, as is required in the design of a start/stop/start conveyor, such as a luggage conveyor, presents a challenge.

In order to speed up the repetition rate of the start/stop/restart function of the conveyor, driven by such a clutch system, it is also desirable to incorporate an efficient fast acting brake in the system, so as to ensure that when the clutch uncouples from the motor, the conveyor stops almost immediately. The brake must release at once when the clutch is again operated to couple the motor to the conveyor.

Clearly also the clutch must be capable of converting the torque from the motor running at its steady state speed and drive the conveyor from standstill to its designed speed in a brief time period.

All of these factors must be built in to a piece of equipment capable of being installed in the confined space inside the conveyor drive roll itself.

BRIEF SUMMARY OF THE INVENTION

With a view to satisfying at least some of the foregoing requirements the invention provides an intermittent internal drive system for a drum conveyor, wherein a conveyor is started, stopped and restarted repeatedly, and having, a drive drum with a drive motor within the drum, a clutch within the drum connected to the motor, and, a brake within the drum.

The invention further seeks to provide an intermittent internal drive system for a drum conveyor of the type described which includes an electromagnetic device operable to cause operation of the clutch.

The invention further seeks to provide an intermittent internal drive system for a drum conveyor of the type described which includes a resilient spring ring and an armature, moveable in response to the electromagnetic device.

The invention further seeks to provide an intermittent internal drive system for a drum conveyor of the type described which includes a driven member, and a drive member coupled to the motor.

The invention further seeks to provide an intermittent internal drive system for a drum conveyor of the type described which includes a non-rotatable brake member, and a rotatable brake member coupled to the drum.

The invention further seeks to provide an intermittent internal drive system for a drum conveyor of the type described which includes a driven member driveable by the motor, and wherein said rotatable brake member is coupled to the driven member of the clutch.

The invention further seeks to provide an intermittent internal drive system for a drum conveyor of the type described which includes a brake control connected to the clutch to release said clutch electromagnetic device, being simultaneous with operation of the brake to cause restraining of said drum.

The invention further seeks to provide an intermittent internal drive system for a drum conveyor of the type described which includes a driven shaft driven by the clutch and a reduction gear train connected to the driven shaft.

The invention further seeks to provide an intermittent internal drive system for a drum conveyor of the type described which includes a stub shaft extending from the drum at each end of said drum coaxial with said driven shaft.

The invention further seeks to provide an intermittent internal drive system for a drum conveyor of the type described which includes wiring extending through one stub shaft and connected with said drive motor and with the clutch and brake.

IN THE DRAWINGS

DESCRIPTION OF A SPECIFIC EMBODIMENT

Figure 1:
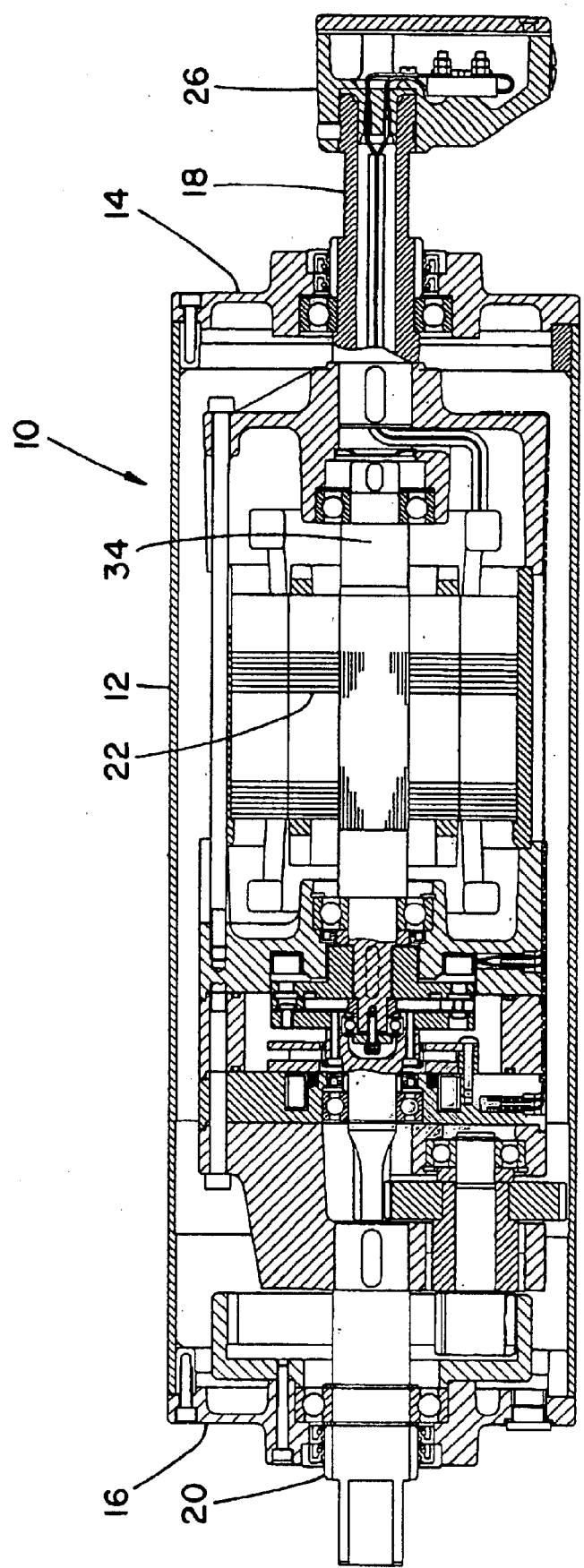
FIG. 1 is a selectional side elevation of a conveyor roll containing a drive motor, clutch and brake system.
Figure 2:
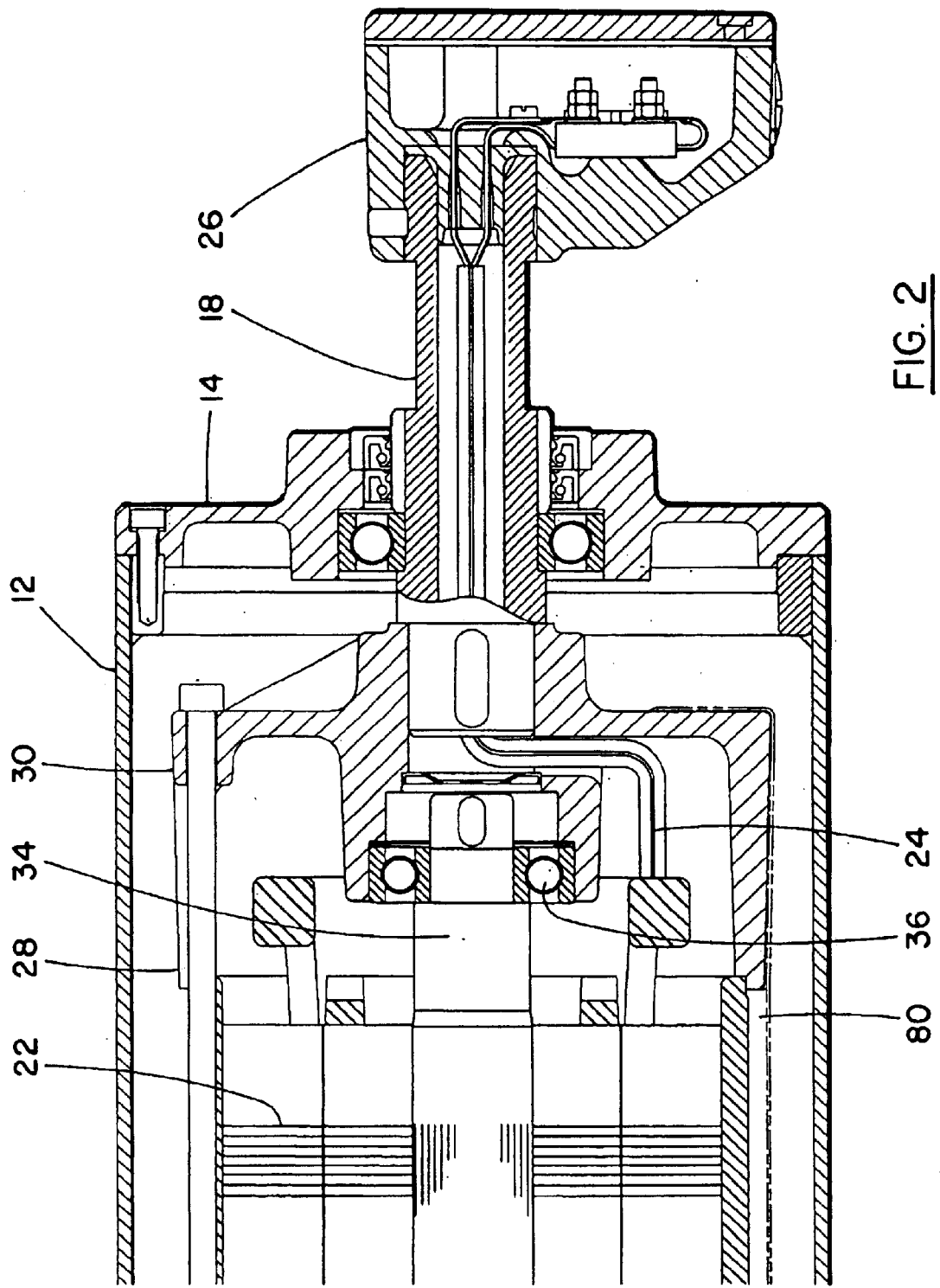
FIG. 2 is an enlarged section corresponding to FIG. 1 but showing only the right hand end of the conveyor roll.
Figure 3:
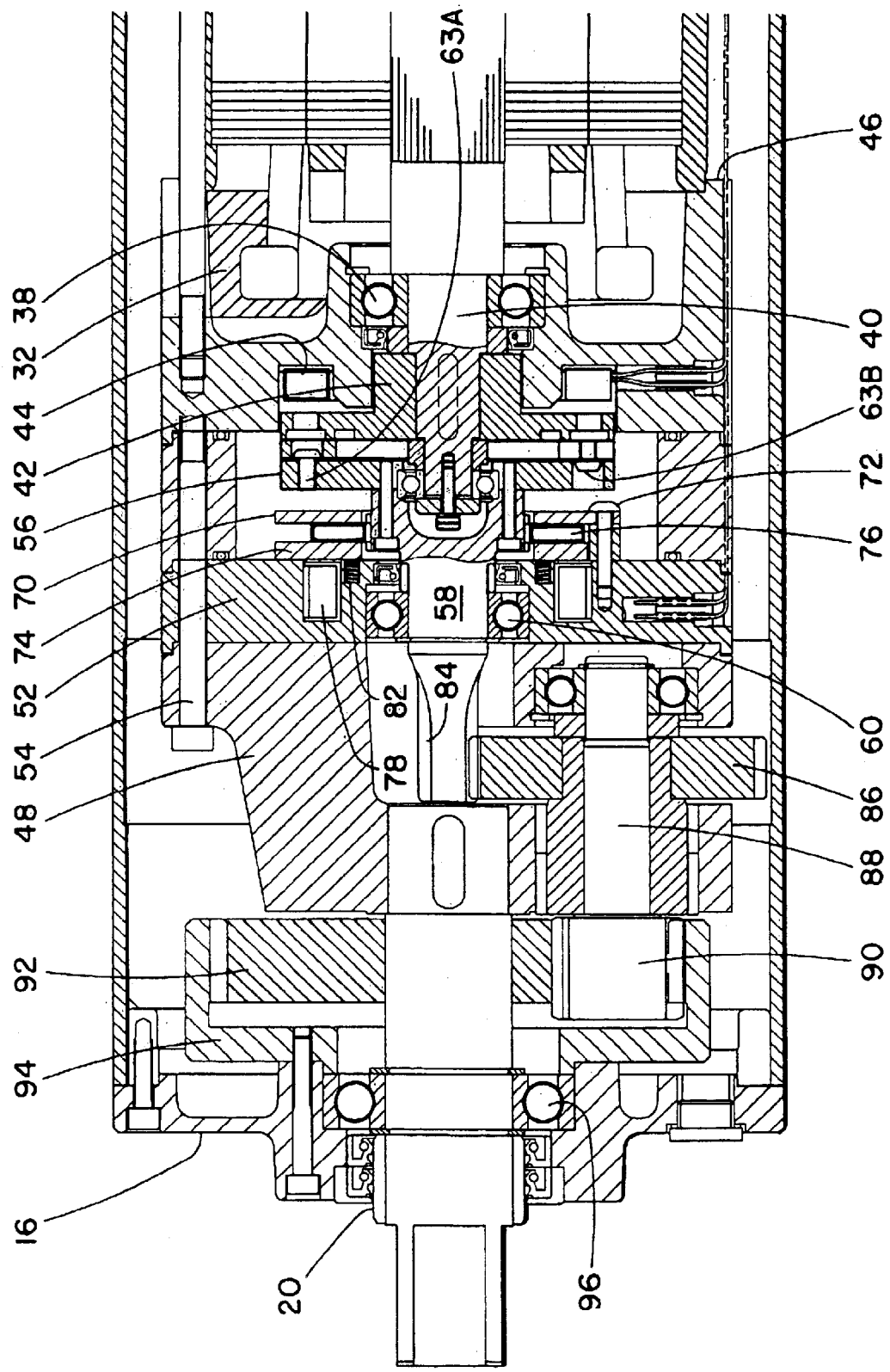
FIG. 3 is an enlarged section corresponding to FIG. 1 showing only the left hand end of the conveyor roll of FIG. 1.
Figure 4:
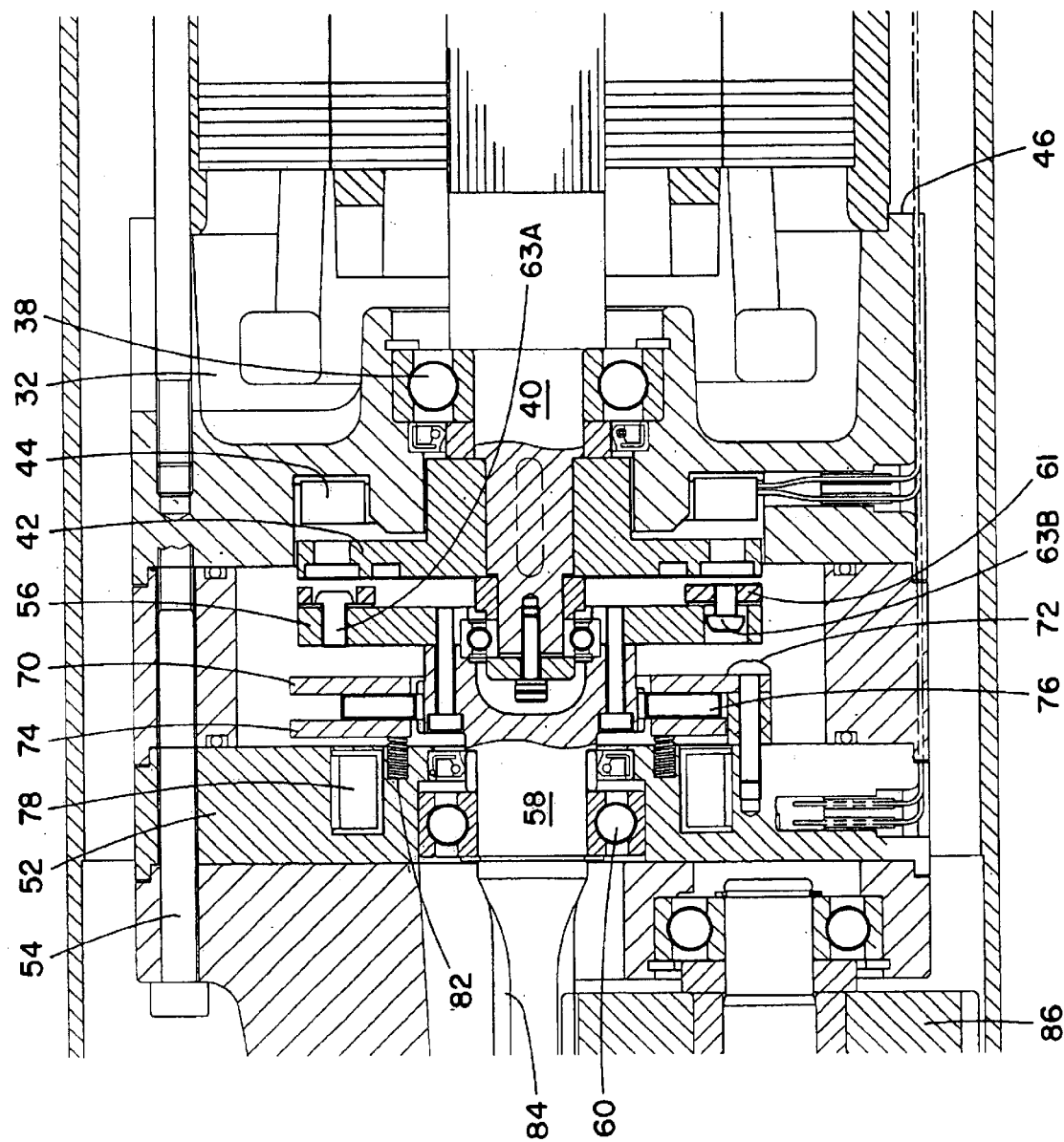
FIG. 4 is a further enlarged section corresponding to FIG. 3 showing only the left hand end of the conveyor roll FIG. 1, and showing the clutch disengaged and the brake engaged; and, FIG. 5 is a view corresponding to FIG. 4 but with the with the clutch engaged and the brake disengaged.

As explained above the invention provides a conveyor drive roll having an internal drive system operable in intermittent mode to start/stop/restart the conveyor, in which both the motor and clutch and brake are all located within the conveyor drive roll.

For the purposes of illustration the conveyor drive roll is assumed to be driving a conveyor system carrying items such as luggage. It is further assumed that the items bear some form of unique coding such as UBC tags, and that each tag on each piece or item must be checked. For this purpose the conveyor must stop and restart repeatedly. This is merely explained for the purpose of illustration only. Many applications arise where this repetitive function of the conveyor is required, and the invention is not restricted solely to use on luggage conveyors.

The conveyor itself, and the items on the conveyor and the UBC reader, or other code reader, or other sensing device, or the like, are not illustrated since they form no part of the invention. It will be appreciated that the invention is not restricted to conveyors for luggage, but is of application in any situation where a conveyor with an internal drive system must be stopped and restarted repeatedly.

In this type of internally driven conveyor, a conveyor drive roll (10) consists of a cylindrical drum (12), having end closures (14) and (16). Stub shafts (18) and (20) extend through respective end closures. The stub shafts can be mounted on any suitable support or frame work (not shown) and secured on for example blocks or clamps (not shown), all of which is known and requires no detailed description. The conveyor media, (not shown) typically a belt or flexible strip of any suitable material, or a matrix of chain links, or the like runs around and is driven by drum (12). Such conveyor media also runs around other conveyor rolls (not shown), and may run over intermediate support rolls (not shown).

Rotation of the drum (12) will drive the conveyor media and carry any product on the conveyor along its desired path.

A electric drive motor (22) is located within drum (12), and is connected to a power source via cables (24). Cables (24) extend out through the interior of stub shaft (18) extending through end closure (14) and will be connected to the power source (not shown), by terminals located within a connector box (26).

Motor (22) is of conventional design and has a stationary housing (28) connected between end plates (30) and (32). A rotor (34) is mounted between bearings (36) and (38). A drive shaft (40) extends from rotor (34) through bearing (38) and end plate (32).

A clutch drive rotor (42) is secured on the free end of drive shaft (40). Electric magnet clutch coil windings (44) are mounted in end plate (32) adjacent clutch drive rotor (42) and are powered by cables (46). Cables (46) extend within drum (12) and exit through stub shaft (18) to the connector box (26). Suitable controls (not shown) can be connected to cables (46) for exciting the windings (44), as will be described below.

A clutch/brake end housing (48) is coupled to intermediate housings (50) and (52) and is secured to motor end plate (32) by bolts (54).

Thus the motor housing (28) and the clutch/brake end housing (48) and the intermediate housings (50) and (52) are all secured together and are held against rotation by being non-rotatably mounted on the inner ends of stub shafts (18) and (20) Within intermediate housing (50) a clutch driven disc (56) is secured on a driven shaft (58). Shaft (58) is also rotatably supported on the end of motor drive shaft (40), for extra support.

Figure 5:
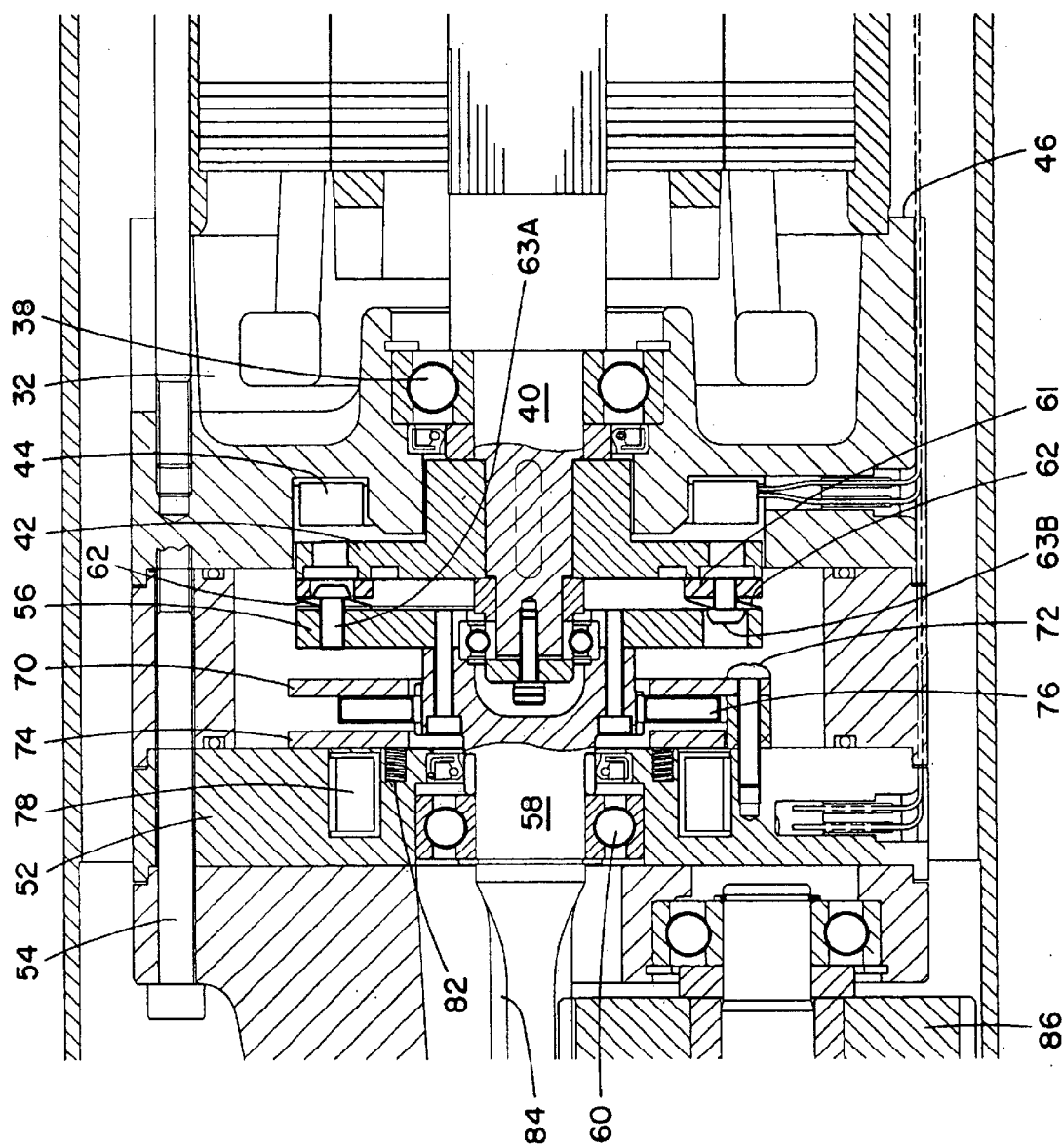

A shaft bearing (60) on motor drive shaft (58) supports the other end of shaft (58) (40). A moveable armature ring (61) is moveably located between driven disc (56) and clutch drive rotor (42). Armature (61) is moveable into and out of engagement with drive rotor (42), in the following manner. Spring (62) (FIG. 5), is located between driven disk (56), and armature (61). Spring (62) is secured to driven disk (56) by bolts (63a), and is secured to armature (61) by bolts (63b). Spring (62) (FIG. 5) operates to secures armature (61) on driven disk (56) to transmit rotation thereto. Spring (62) functions as a tension spring. When the windings (44) are not energized, spring (62), biases armature (61) to lie normally against driven disc (56), causing disengagement of the clutch.

Armature (61) is moveable in response to excitation of windings (44) to be moved away from disk (56) and towards rotor (42), for driving engagement thus causing engagement of the clutch.

This action, ie the excitation of the windings (44), and the disconnection of windings (44) alternately couples and uncouples the motor (22) from the drum (12).

In order to stop rotation of drum (12) abruptly, a brake mechanism is provided which comprises a non-sliding brake plate (70) mounted on driven shaft (58) and secured by bolts (72).

A slidable brake disk (74) is slidably mounted on driven shaft (58) but is not bolted thereto. In this way driven shaft

(58) is free to rotate within slidable brake disk (74), when the brake is released, as described below.

A frictional brake pad (76) is located between plate (70) and disk (74).

Electrical magnetic brake windings (78) are mounted in intermediate housing (52), and are energised by cables (80). Cables (80) extend through the interior of drum (12) and exit in the connection box (26) from which they can be connected to suitable controls (not shown).

Brake springs (82) are also mounted in intermediate housing (52) and normally urge slidable brake disk (74) towards non-slidable brake plate (70), thereby frictionally engaging brake pad (76) and providing a strong retarding force on the driven shaft (58).

Excitation of windings (78) will draw slidable brake disk (74) to move away from non-slidable brake plate (70), while at the same time compressing springs (82).

Disc (74) will thus disengage from frictional brake pad (76), thereby releasing driven shaft (58).

Driven shaft (58) has spline teeth (84) meshing with idler gear (86) rotatably mounted to one side of end housing (48), on shaft (88). Drive gear (90) is mounted on shaft (88) and meshes with the interior ring gear (92), extending from plate (94).

Ring gear (92) and plate (94) are rotatably mounted on bearing (96) carried on fixed stub shaft (20).

Driven hub (94) is bolted to end closure (16) of drum (12). Thus when ring gear (92) and plate (94) rotate, they rotate drum (12) Around fixed stub shaft (20), causing movement of the conveyor media (not shown) carried on drive drum (12).

IN OPERATION, the motor (22) is energised by operation of a suitable start switch (not shown) and starts rotation, with the clutch rotor (42) and armature ring (61) "open" or disengaged, and the clutch winding (44) disconnected, and with the brake plate (70) and brake disk (74) urged together, by extension of springs (82). so that the brake is "on", or engaged, holding driven shaft (58) stationary.

In this mode the motor runs quickly up to operating speed with no load, and thus power consumption due to power surges on start up is minimised.

Once the motor (22) is at operating speed and power consumption has stabilised, by the operation of simple electrical controls (not shown) windings (44) and (78) are excited thus engaging clutch rotor (42) and armature (61) and at the same time releasing the brake disk (74) from the friction disc (76).

The drive shaft (40) of the motor (22) is thus connected to driven shaft (58). Rotation of driven shaft (58) will drive idler gear (86) rotatably mounted to one side of end housing (48). Idler gear (86) meshed with the interior ring gear (92), will rotate ring gear (92) and plate (94). Plate (94) is freely rotatable on bearing (96), carried on fixed stub shaft (20). Plate (94) is bolted to end closure (16). When plate (94) rotates, it rotates drum (12) causing movement of the conveyor media (not shown) carried on drum (12).

Usually such a start/stop conveyor will be equipped with proximity sensor devices (not shown) of a type well known in the art, which may for example be simple photoelectric cells or any other type of sensor. When such a sensor detects an item on the conveyor, it will deliver signals to the clutch disc windings (44) to disconnect and thus de-energise thus disengaging the clutch, and signals to the brake windings (78) to energise thus engaging the brake and bringing the conveyor to a halt. After scanning, or whatever other operation is required while the conveyor is at a stand still, the scanner or other equipment will signal to de-energise the brake windings (78) and to energise the clutch windings, thus disengaging the brake plate (70) and brake disk (74), and engaging the clutch rotor (42) and disk (56). This will cause the drum (12) to restart and the conveyor will move, until it is stopped again when the proximity sensor or other device detects another item to be examined or treated.

Throughout the scanning (or other) operation the motor will have continued running free of load. As soon as the clutch engages the motor will take up the load once more, probably slowing briefly while it brings the conveyor up to speed.

The foregoing is a description of a preferred embodiment of the invention which is given here by way of example only. The invention is not to be taken as limited to any of the specific features as described, but comprehends all such variations thereof as come within the scope of the appended claims.

What is claimed is:

1. An intermittent internal drive system for a rum conveyor, wherein said conveyor is started, stopped and restarted repeatedly, and comprising:

a drive drum defining a hollow interior;

a drive motor mounted within and enclosed by said drum and operable to rotate said drum;

a clutch located within and enclosed by said drum and connected to said motor and operable to transmit rotation from said motor to said drum, and being operable to discontinue transmission from said motor to said drum; and a brake within and enclosed by said drum and connected to said drum and being operable to stop rotation of said drum, and being operable to permit rotation of said drum, and an actuator, wherein the intermittent internal drive system is operable to maintain the clutch in a disengaged position, and the brake in an engaged position such that the drum is in a rotating stopped position; and wherein the actuator is operable in substantially the same moment to activate the clutch to achieve an engaged position, and further to activate the brake to achieve a disengaged position, thereby transferring rotation from said motor to said rum and permitting said drum to rotate.

2. An intermittent internal drive system for drum conveyor, as claimed in claim 1, wherein said clutch includes a moveable member, and said actuator including an electromagnetic device operable to cause attraction of said moveable member to a rotating member of said drum.

3. An intermittent internal drive system for a drum conveyor, as claimed in claim 2 wherein said moveable member includes a resilient spring ring and an armature that normally biased away from said electromagnetic device and being moveable in response to said electromagnetic device to move towards said electromagnetic device.

4. An intermittent internal drive system for a drum conveyor, as claimed in claim 2, wherein said moveable member is mounted on a driven member, and wherein said clutch further includes a drive member coupled to said motor, said moveable member being moveable into driven engagement with said drive member, for driving said driven member thereby driving said drum and being moveable away from said drive member to disconnect said engagement.

5. An intermittent internal drive system for a drum conveyor, as claimed in claim 1 wherein said brake includes a non-rotatable brake member, and a rotatable brake member coupled to said drum and rotatable therewith, and an electromagnetic device operable to case interengagement between said non-rotatable member and said rotatable member for restraining rotation of said drum.

6. An intermittent internal drive system for a drum conveyor, as claimed in claim 5 wherein said clutch includes a driven member driveable by said motor, and wherein said rotatable brake member is coupled to said driven member of said clutch.

7. An intermittent internal drive system for a drum conveyor, as claimed in claim 6 including a clutch control and a brake control connected to respective clutch electromagnetic and brake electromagnetic devices, operation of said clutch control to release said clutch electromagnetic device, being simultaneous with operation of said brake electromagnetic device to cause restraining of said drum.

8. An intermittent internal drive system for a drum conveyor, as claimed in claim 1 including a driven shaft driven by said clutch and a reduction gear train connected to said shaft and operatively coupled to said drum for driving said drum upon operation of said driven shaft.

9. An intermittent internal drive system for a drum conveyor, as claimed in claim 8 and including a stub shaft extending from said drum at each end of said drum coaxial with said driven shaft, said drum being freely rotatable on said stub shafts whereby said drum may be mounted in position in a conveyor by means of said stub shafts.

10. An intermittent internal drive system for a drum conveyor, as claimed in claim 8 and including wiring extending through one said stub shaft and connected with said drive motor and with respective said clutch and brake electromagnetic device.

11. An intermittent internal drive system for a drum conveyor, wherein said conveyor is started, stopped and restarted repeatedly, and comprising:
- a drive drum defining a hollow interior;
- a drive motor mounted within and enclosed by said drum and operable to rotate said drum;
- a clutch located within and enclosed by said drum and connected to said motor and operable to discontinue transmission from said motor to said drum; and, a brake within and enclosed by said drum and connected to said drum and being operable to stop rotation of said drum; and being operable to permit rotation of said drum;

wherein said clutch include a moveable member, and including an electromagnetic device operable to cause attraction of said moveable member;

wherein said moveable member include a resilient spring ring and an armature normally biased away from said electromagnetic device and being moveable in response to said electromagnetic device to move towards said electromagnetic device.

12. An intermittent internal drive system for a drum conveyor, wherein said conveyor is started, stopped and restarted repeatedly, and comprising
- a drive drum defining a hollow interior,
- a drive motor mounted within and enclosed by said drum and operable to rotate said drum,
  - a clutch located within and enclosed by said drum and connected to said motor and operable to discontinue transmission from said motor to said drum, and, a brake within and enclosed by said drum and connected to said drum and being operable to stop rotation of said drum, and being operable to permit rotation of said drum, wherein said brake includes a non-rotatable brake member, and a rotatable brake member coupled to said drum and rotatable therewith, and an electromagnetic device operable to cause interengagement between said nonrotatable member and said rotatable member for restraining rotation of said drum.

13. An intermittent internal drive system for a drum conveyor, as claimed in claim 12 wherein said clutch includes a driven member driveable by said motor, and wherein said rotatable brake member is coupled to said driven member of said clutch.

14. An intermittent internal drive system for a drum conveyor, as claimed in claim 13 including a clutch control and a brake control connected to respective clutch electromagnetic and brake electromagnetic devices, operation of said clutch control release said clutch electromagnetic device, being simultaneous with operation of said brake electromagnetic device to cause restraining of said drum.

* * * * *